(12) United States Patent
Yu (10) Patent No.: US 8,896,551 B2
(45) Date of Patent: Nov. 25, 2014

(54) SYSTEM AND METHOD FOR IMPROVING RECOGNITION OF A TOUCH KEYBOARD OF AN ELECTRONIC DEVICE

(75) Inventor: Yi-Chun Yu, New Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 673 days.

(21) Appl. No.: 13/167,716

(22) Filed: Jun. 24, 2011

(65) Prior Publication Data

US 2012/0249434 A1  Oct. 4, 2012

(30) Foreign Application Priority Data

Apr. 1, 2011 (TW) .................................. 100111624

(51) Int. Cl.
*G06F 3/041* (2006.01)
*G06F 3/0488* (2013.01)

(52) U.S. Cl.
CPC .................................. *G06F 3/04886* (2013.01)
USPC ............ 345/173; 345/156; 715/773; 715/863

(58) Field of Classification Search
CPC ............................ G06F 3/04886; G06F 3/0238
USPC .......... 345/156, 168, 169, 173, 174; 715/773, 715/863, 864

See application file for complete search history.

(56) References Cited

U.S. PATENT DOCUMENTS

| | | | |
|---|---|---|---|
| 2006/0085757 A1* | 4/2006 | Andre et al. ................... | 715/771 |
| 2009/0146957 A1* | 6/2009 | Lee et al. ...................... | 345/168 |
| 2010/0315266 A1* | 12/2010 | Gunawardana et al. ........ | 341/22 |

* cited by examiner

*Primary Examiner* — Koosha Sharifi-Tafreshi
(74) *Attorney, Agent, or Firm* — Novak Druce Connolly Bove + Quigg LLP (57) ABSTRACT

A system and a method for improving recognition of a touch keyboard in an electronic device include setting a fuzzy set corresponding to each virtual key of the touch keyboard displayed on a touch panel. The improving method further includes receiving coordinates of a touch point on the touch panel, confirming a touched virtual key corresponding to the touched coordinates and executing a function of the touched virtual key. The improving method further confirming one or more adjacent virtual keys of the touched virtual key, and revising a fuzzy set of the received virtual key or a fuzzy set of an adjacent virtual key, if a backspace virtual key and the adjacent virtual key have been touched in turn after the touched virtual key.

15 Claims, 7 Drawing Sheets

SYSTEM AND METHOD FOR IMPROVING RECOGNITION OF A TOUCH KEYBOARD OF AN ELECTRONIC DEVICE

BACKGROUND

1. Technical Field

Embodiments of the present disclosure relate to recognition technology, and more particularly to a system and a method for improving recognition of a touch keyboard of an electronic device.

2. Description of Related Art

A common data input technique of an electronic device utilizes a physical keyboard, or a virtual keyboard displayed on a touch screen of the electronic device. It is possible that the virtual keyboard may one day replace the physical keyboard in the electronic devices. However, people mostly operate the virtual keyboard (e.g. press a virtual key on the virtual keyboard) using fingers, and the fingers are commonly larger than the virtual keys on the virtual keyboard. Therefore, typing recognition on the virtual keyboard may be not accurate. In conclusion, a system and a method for improving recognition of a touch keyboard of an electronic device are desired.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
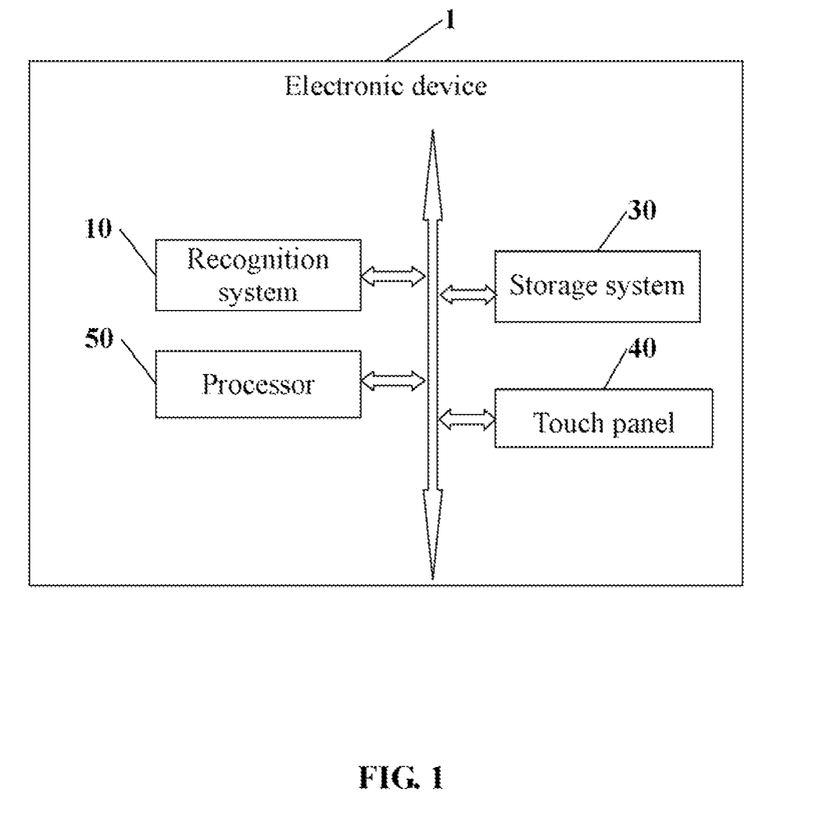
FIG. 1 is a block diagram of one embodiment of an electronic device including a recognition system.

FIG. 1 is a block diagram of one embodiment of an electronic device 1. The electronic device 1 includes a recognition system 10 and a touch panel 40. The touch panel 40 may display a touch keyboard. The recognition system 10 may improve recognition of the touch keyboard displayed on the touch panel 40.

Figure 2:
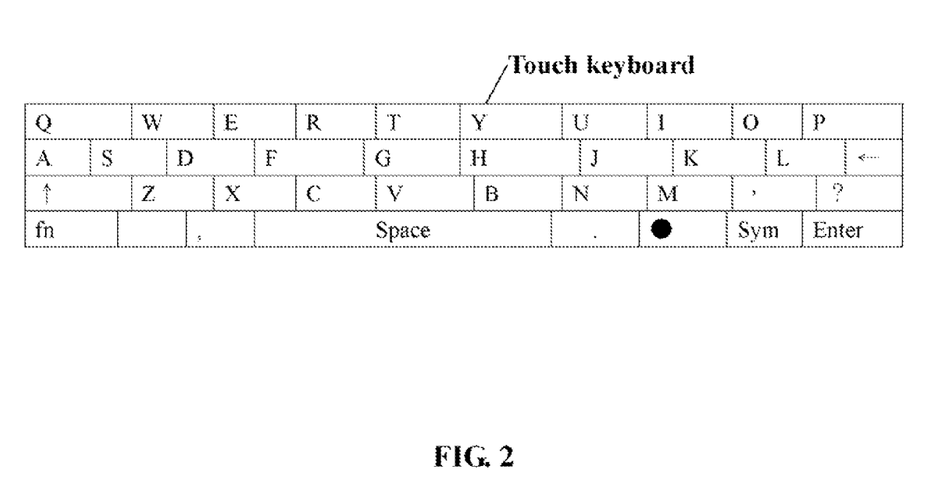
FIG. 2 is a schematic diagram of a touch keyboard of the electronic device of FIG. 1.

The touch keyboard is a virtual keyboard displayed on the touch panel 40 and operable to input information by a user contacting the touch panel 40 either using a finger, fingers, a stylus, or a combination thereof. As shown in FIG. 2, the touch keyboard may be arranged in a form of traditional computer keyboard including virtual letter keys, and virtual function keys, such as the "Enter" virtual key, and the "Backspace" virtual key. In other embodiments, the virtual keys in the touch keyboard may be configured according to other arrangements according to the necessary requirements or input habits of the user. The touch panel 40 displays visible information the electronic device 1, such as images or letters, for example. In addition, the touch panel 40 can display the touch keyboard to receive input from the user. In some embodiments, the touch panel 40 can be a resistive touch screen, or a capacitive touch screen.

The electronic device 1 further includes a storage system 30 and at least one processor 50. The storage system 30 stores various data of the electronic device 1. The storage system 30 may be a memory of the electronic device 1, or an external storage card, such as a smart media (SM) card, or a secure digital (SD) card. The at least one processor 50 executes one or more computerized codes and other applications of the electronic device 1, to provide the functions of the recognition system 10.

Figure 3:
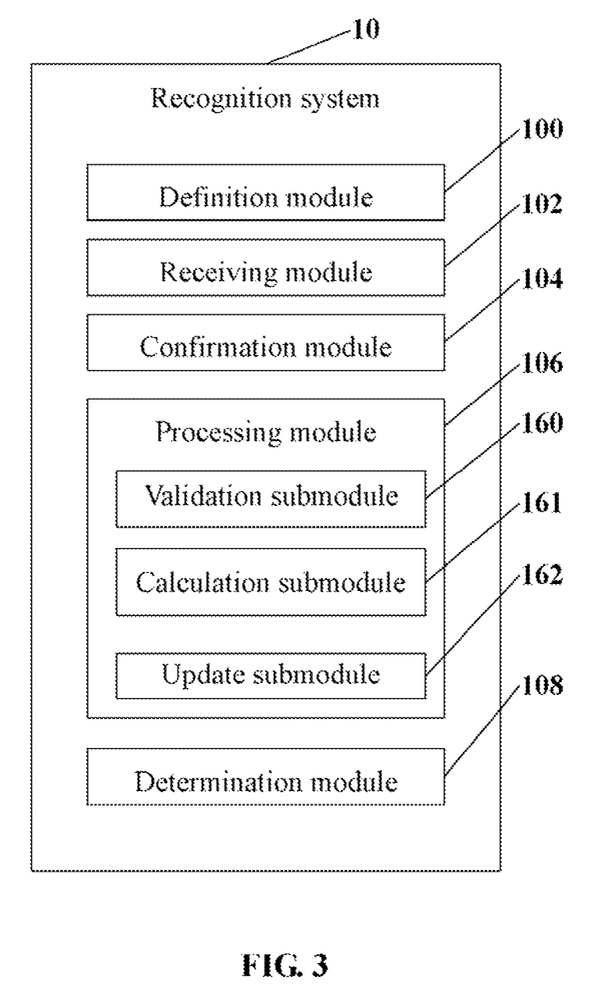
FIG. 3 is a block diagram of one embodiment of a recognition system of FIG. 1.

FIG. 3 is a block diagram of one embodiment of a recognition system of FIG. 1. In some embodiments, the recognition system 10 may include a definition module 100, a receiving module 102, a confirmation module 104, a processing module 106, and a determination module 108. The modules 100, 102, 104, 106, and 108 comprise computerized codes in the form of one or more programs that are stored in the storage system 30. The computerized code includes instructions that are executed by at least one processor 50 to provide functions for the modules 100, 102, 104, 106, and 108. Details of these operations are as followed.

The definition module 100 defines a fuzzy set corresponding to each virtual key of the touch keyboard displayed on the touch panel 40, and stores the fuzzy set in the storage system 30. In some embodiments, the fuzzy set corresponding to each virtual key defines a plurality of membership functions of each virtual key. Each of the membership functions correspond to an x interval and a y interval of a coordinate system based on the touch panel 40. The recognition system 10 may generate a set of x coordinates and y coordinates in response to receiving the touch of the user from the touch panel 40, to determine a fuzzy set corresponding to the set of x coordinate and y coordinate, and to determine the virtual key touched by the user according to the fuzzy set.

Figure 4:
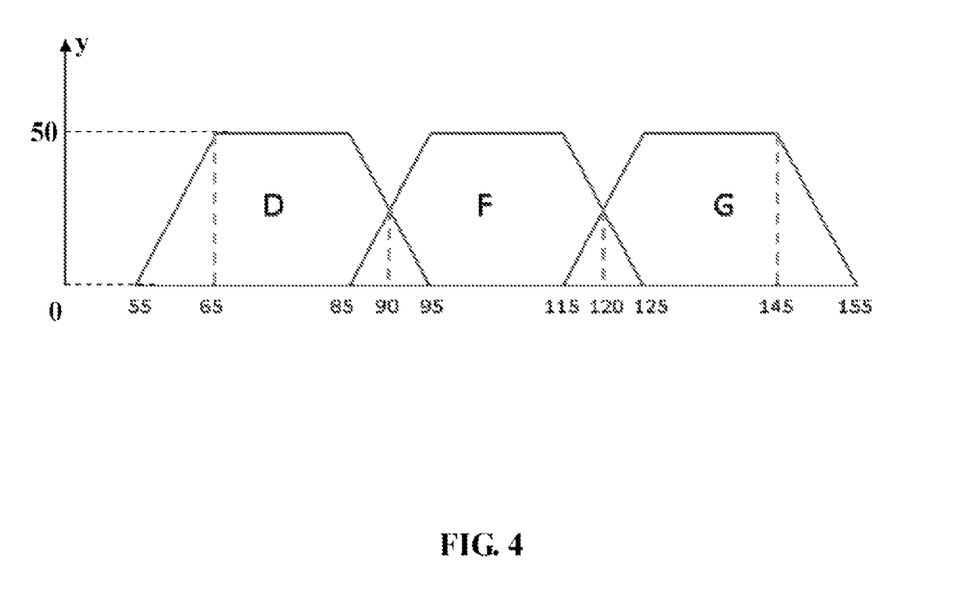
FIG. 4 is a schematic diagram of one embodiment of a number of fuzzy sets of virtual keys on a touch keyboard of FIG. 2.

Referring to FIG. 4, a schematic diagram of one embodiment of a number of fuzzy sets of the virtual keys of the touch keyboard is shown. For example, the schematic diagram shows the fuzzy sets of virtual keys "D", "F" and "G". Each fuzzy set of the virtual keys "D", "F" and "G" includes respective membership functions in graphics mode in FIG. 4. For example, the respective membership functions are shown as following. "μD (x, y)" represents $$\begin{cases} 0, \text{ if } y < 50, y \geq 100 \\ 0, \text{ if } x < 55, x > 95 \\ 0.1x - 5.5, \text{ if } 55 \leq x \leq 65, 50 \leq y < 100 \\ 1, \text{ if } 65 < x < 85, 50 \leq y < 100 \\ -0.1x + 9.5, \text{ if } 85 \leq x \leq 95, 50 \leq y < 100 \end{cases};$$

"µf (x, y)" represents $$\begin{cases} 0, \text{ if } y < 50, y \geqq 100 \\ 0, \text{ if } x < 85, x > 125 \\ 0.1x - 8.5, \text{ if } 85 \leqq x \leqq 95, 50 \leqq y < 100 \\ 1, \text{ if } 95 < x < 115, 50 \leqq y < 100 \\ -0.1x + 11.5, \text{ if } 115 \leqq x \leqq 125, 50 \leqq y < 100 \end{cases};$$

and "µG (x, y)" represents $$\begin{cases} 0, \text{ if } y < 50, y \geqq 100 \\ 0, \text{ if } x < 115, x > 155 \\ 0.1x - 11.5, \text{ if } 115 \leqq x \leqq 125, 50 \leqq y < 100 \\ 1, \text{ if } 125 < x < 145, 50 \leqq y < 100 \\ -0.1x + 15.5, \text{ if } 145 \leqq x \leqq 155, 50 \leqq y < 100 \end{cases}.$$

The receiving module 102 receives coordinates of a touch point on the touch panel 40 according to a user operation on the touch panel 40. The coordinates of the touch point includes an x coordinate and a y coordinate based on the coordinate system on the touch panel 40.

The confirmation module 104 confirms a virtual key corresponding to the received coordinates according to the fuzzy sets of the virtual keys on the touch keyboard, determines the virtual key as a touched virtual key and the received coordinates as touched coordinates. The confirmation module 104 confirms at least one membership function in the fuzzy sets according to the received coordinates, and may obtain at least one non-zero membership function value. In some embodiments, the number of the membership function value corresponding to the received coordinates of the touch point may be one or two. Under the condition that the number is one, the confirmation module 104 confirms the virtual key by confirming the membership function value from the plurality of the fuzzy sets according to the received coordinates. Under the condition that the number is two, the confirmation module 104 confirms the virtual key by confirming the larger membership function value between the two membership function values.

For example, if the coordinates of the touch point on the touch panel 40 is (103, 72), the confirmation module 104 may confirm that one membership function is "µF (x, y)=1, if 95<x<115,50≦y<100" corresponding to the fuzzy set of the virtual key "F", that is, "µF (103, 72)=1". Therefore, the confirmation module 104 confirms that the virtual key "F" is touched by the user. As shown in FIG. 4, when the coordinates of the touch point is belong to an x interval of [85,95] and a y interval of [50,100], the number of the membership function is two. If the coordinates of the touch point on the touch panel 40 is (87, 80), the confirmation module 104 may confirm two membership function "µF (x, y)=0.1x−8.5, if 85<x<95, 50≦y<100" and "µD (x, y)=−0.1x+9.5, if 85<x<95, 50≦y<100". The two membership function values are "µF (87,80)=0.2" and "µD (87,80)=0.8". Because the value of the "µD (87,80)=0.8" is higher that the value of the "µF (87,80)=0.2", the confirmation module 104 confirms that the virtual key "D" is touched by the user.

The processing module 106 executes a function corresponding to the touched virtual key on the virtual keyboard 20. In some embodiments, if the touched virtual key is a numeric key, a letter key, or a punctuation key, the processing module 106 may display the number, letter or punctuation corresponding to the touched virtual key on the touch panel 40 of the electronic device 1. For example, if the touched virtual key is one of the function keys, such as the "Backspace" virtual key, the "Enter" virtual key or the "Delete" virtual key, the processing module 106 may execute a backspace function corresponding to the "Backspace" virtual key, an enter function corresponding to the "Enter" virtual key, or a delete function corresponding to the "Delete" virtual key.

The confirmation module 104 further confirms one or more adjacent virtual keys of the touched virtual key, after the function of the touched virtual key is executed. In some embodiments, the one or more adjacent virtual keys of the touched virtual key may have an intersection on the x interval with the touched virtual key. For example, the virtual key "F" has the intersection on an x interval [85-95] with the virtual key "D", thus the virtual key "D" is one of the adjacent virtual keys of the virtual key "F".

The determination 108 determines whether the backspace virtual key on the touch keyboard has been touched after the touched virtual key. The determination module 108 may determine whether the virtual key of the received coordinates is the backspace virtual key after the touched virtual key. In some embodiment, if the determination module 108 determines that the backspace virtual key has been touched after the touched virtual key, the processing module 106 may execute a backspace function, such as deleting a previous input of the virtual key on the touch panel 40, for example.

In addition, after the backspace virtual key has been touched, the determination module 108 continues to determine whether the continuous received coordinates is one of the adjacent virtual keys of the touched virtual key. If the backspace virtual key and the adjacent virtual key in turn have been touched after the touched virtual key, the processing module 106 further revises a fuzzy set of the touched virtual key or a fuzzy set of the adjacent virtual key. The processing module 106 further stores the revised fuzzy set of the touched virtual key or the adjacent virtual key into the storage system 30, to replace an original fuzzy set of the touched virtual key or the adjacent virtual key.

The determination module 108 further determines whether inputs of the virtual keys have been finished. In some embodiments, if the electronic device 1 exits an editing mode, the determination module 108 determines that the inputs of the virtual keys have been finished. Otherwise, if the electronic device 1 is still in the editing mode, the determination module 108 will determine that the inputs of the virtual keys have not been finished.

In some embodiments, the processing module 106 may includes a validation submodule 160, a calculation submodule 161 and an update submodule 162. The submodules 160, 161 and 162 also comprise computerized codes in the form of one or more programs that are stored in the storage system 30. The computerized code includes instructions that are executed by at least one processor 50 to provide functions for the modules 160, 161 and 162. Details of these operations are as followed.

The validation submodule 160 validates the number of the non-zero membership function value corresponding to the touched coordinates.

The update submodule 162 maintains the fuzzy set of the touched virtual key and the fuzzy set of the adjacent virtual key, if the number of the non-zero membership function value corresponding to the touched coordinates is one.

The validation submodule 160 confirms whether a maximum membership function value is equal to "1", if the number of the non-zero membership function value corresponding to touched coordinates is two.

If the maximum membership function value is equal to "1", the calculation submodule 161 calculates a new membership function of the touched virtual key according to the touched coordinates. If the maximum membership function value is not equal to "1", the calculation submodule 161 will calculate a new membership function of the adjacent virtual key according to the touched coordinates. The calculation submodule 161 further calculates new intervals in the fuzzy set of the touched virtual key, or new intervals in the fuzzy set of the adjacent virtual key.

Furthermore, the update submodule 162 updates the fuzzy set of the touched virtual key or the fuzzy set of the adjacent virtual key, according to the new membership and the new intervals.

Figure 5:
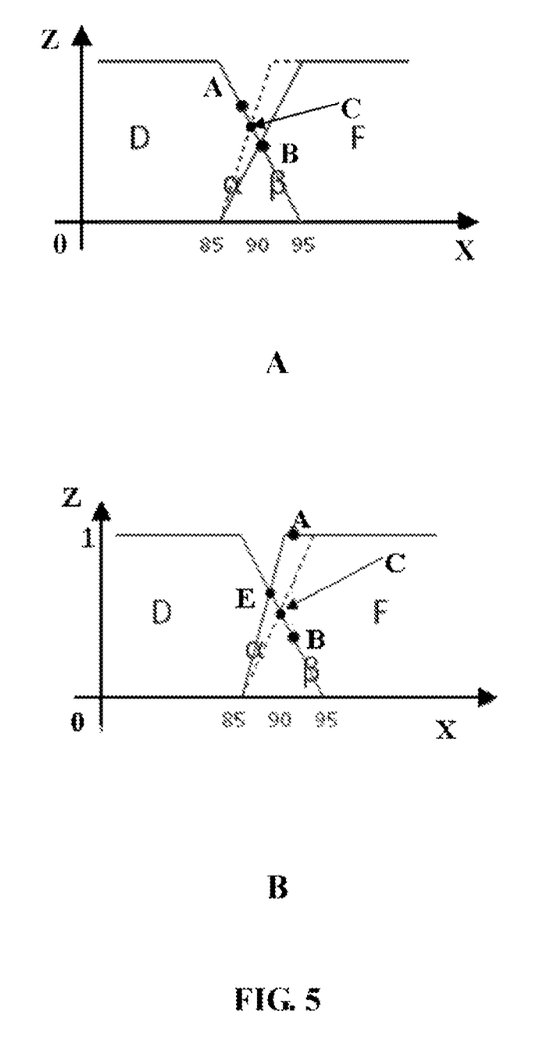
FIG. 5A and FIG. 5B are schematic diagrams of one embodiment of revising a fuzzy set.

FIG. 5A and FIG. 5B are schematic diagrams of one embodiment of revising a fuzzy set. The processing module 106 calculates the new membership using an expression of "z=ax+b", with "z" representing "μF (x, y)", and "a" representing a slope of the new membership function, and "b" represents a constant. Details of these operations follow.

As shown in FIG. 5A, the maximum membership function value is not equal to "1", and the virtual key "D" (the touched virtual key), the backspace virtual key, and the virtual key "F" (the adjacent virtual key) has been touched in turn. In FIG. 5A, combining with the above mentioned fuzzy sets of the virtual key "D" and "F", a line segment between the intervals "85≤x≤95" of the virtual key "F" is marked with "α", and the corresponding membership function of "a" is "μF (x, y)=0.1x−8.5". A line segment between the intervals "85≤x≤95" of the virtual key "D" is marked with "β", and the corresponding membership function of "β" is "μD (x, y)=−0.1x+9.5". A point "B($x_2$, $z_2$)" in FIG. 5A represents an original point of intersection between "α" and "β". If the touched coordinates of the virtual key "D" is ($x_1$=88, $y_1$=75), the validation submodule 160 validates the number of the non-zero membership function value corresponding to the touched coordinates (88, 75) is two. One value is "μF (88, 75)=0.3", and another value is "μD (88, 75)=0.7". A point "A($x_1$, $z_1$)" in the FIG. 5A represents the membership function value "0.7" of "μD(88, 75)" corresponding to the "$x_1$".

In the FIG. 5A, the calculation module 161 first determines a midpoint between the point "B($x_2$,$y_2$)" and the point "A($x_1$=88,$z_1$=0.7)", to be a new intersection "C($x_4$,$y_4$)" between the new membership function of the virtual key "F" and the membership function of the virtual key "D". The point "B($x_2$,$y_2$)" is calculated by substituting "x2" and "y2" to calculate "μF (x, y)=0.1x−8.5" and "μD (x, y)=−0.1x+9.5", to obtain the point "B($x_2$=90,$y_2$=0.5)". The calculation module 161 further calculates the slope "a" of the new membership function according to the point $$C\left(x4 = \frac{x_1 + x_2}{2}, z4 = \frac{z_1 + z_2}{2}\right)$$

and a point "($x_3$, $z_3$=0)". The "$x_3$" is calculated according to substituting "$z_3$=0" into "μF(x, y)=0.1x−8.5", to obtain "$x_3$=85". The slope "a" is calculated by ($z_4$−$z_3$)÷($x_4$−$x_3$)=0.15. The new membership function is expressed as "z=0.15x+b". The constant "b" is calculated by substituting ($x_3$=85, $z_3$=0) into "z=0.15x+b" to obtain the constant "b"=−12.75. The new membership function is "z=0.15x+b", as shown a dotted line in FIG. 5A. The calculation module 161 further revises the x intervals of the new membership function by substituting the "z"=1 into the new membership function, to obtain the "x=91.67". The update module 162 uses the new membership function to replace the membership function corresponding to the touched coordinates, and uses "x=91.67" to replace "x=95". "x=95" makes the membership function value of "μF (x, y)" to "1". The update module 162 stores the revised fuzzy set of the virtual key "F" in the storage system 30. The revised fuzzy set of the virtual key "F" is shown as following:

$$\mu F(x'y) = \begin{cases} 0, \text{ if } y < 50, y \geq 100 \\ 0, \text{ if } x < 85, x > 125 \\ 0.15x - 12.75, \text{ if } 85 \leq x \leq 91.67, 50 \leq y < 100 \\ 1, \text{ if } 91.67 < x < 115, 50 \leq y < 100 \\ -0.1x + 11.5, \text{ if } 115 \leq x \leq 125, 50 \leq y < 100 \end{cases}.$$

As shown in FIG. 5B, the maximum membership function value is equal to "1". The virtual key "F" (the touched virtual key), the backspace virtual key, and the virtual key "D" (the adjacent virtual key) have been touched in that order. Now the fuzzy set of the virtual key "F" is $$\mu F(x'y) = \begin{cases} 0, \text{ if } y < 50, y \geq 100 \\ 0, \text{ if } x < 85, x > 125 \\ 0.15x - 12.75, \text{ if } 85 \leq x \leq 91.67, 50 \leq y < 100 \\ 1, \text{ if } 91.67 < x < 115, 50 \leq y < 100 \\ -0.1x + 11.5, \text{ if } 115 \leq x \leq 125, 50 \leq y < 100 \end{cases},$$

and "α" represents a line segment between the "85≤x≤91.67" intervals of the virtual key "F", and "β" represents the line segment between the "85≤x≤95" intervals of the virtual key "D". A point "E ($x_2$,$z_2$)" in the FIG. 5B represents an original point of an intersection between "α" and "β". If the touched coordinates of the virtual key "F" is ($x_1$=92,$y_1$=72), the validation submodule 160 will validate that one membership function value is "μF (92, 72)=1", and another membership function value is "μD(92, 72)=0.3". A point "B($x_1$,$z_1$)" in the FIG. 5A represents the membership function value "0.7" of the "μD (92, 72)" corresponding to the "$x_1$". A point "A($x_1$, $z_1$)" in the FIG. 5A represents the membership function value "1" of the "μF (92, 75)" corresponding to the "$x_1$".

In FIG. 5B, the calculation module 161 first determines a midpoint between the point "E($x_2$,$y_2$)" and the point "B($x_1$=92,$z_1$=0.3)" to be a new point of intersection "C ($x_4$, $y_4$)" between the new membership function of the virtual key "F" and the membership function of the virtual key "D". The point "E($x_2$,$y_2$)" is calculated by substituting the ($x_2$,$y_2$) into the "μF (x, y)=0.15x−12.75" and "μD (x, y)=−0.1x+9.5", to obtain the point "B($x_2$=89,$y_2$=0.6)". The calculation module 161 further calculates the slope "a" of the new membership function according to the point $$C\left(x4 = \frac{x_1 + x_2}{2}, z4 = \frac{z_1 + z_2}{2}\right)$$

and a point "($x_3$, $z_3$=0)". The "$x_3$" is calculated by substituting "$z_3$=0" into the "μF (x, y)=0.15x−12.75", to obtain "$x_3$=85". The slope "a" is calculated by ($z_4$−$z_3$)÷($x_4$−$x_3$)=0.1. The new membership function is expressed as "z=0.1x+b". The constant "b" is calculated by substituting the ($x_3$=85, $z_3$=0) into "z=0.1x+b", to obtain the constant "b"=−8.5. The new membership function is "z=0.1x−8.5", as shown a dotted line in FIG. 5B. The calculation module 161 further revises the x intervals of the new membership function by substituting the "z"=1 into the new membership function, to obtain the "x=95". The update module 162 uses the new membership function to replace the membership function corresponding to the touched coordinates, and uses "x=95" to replace "x=91.67". The "x=91.67" makes the membership function value of "μF (x, y)" into "1". The update module 162 stores the revised fuzzy set of the virtual key "F" in the storage system 30. The revised fuzzy set of the virtual key "F" is shown as following:

$$\mu F\ (x'y) = \begin{cases} 0, \text{if } y < 50, y \geqq 100 \\ 0, \text{if } x < 85, x > 125 \\ 0.1x - 8.5, \text{if } 85 \leqq x \leqq 95, 50 \leqq y < 100 \\ 1, \text{if } 95 < x < 115, 50 \leqq y < 100 \\ -0.1x + 11.5, \text{if } 115 \leqq x \leqq 125, 50 \leqq y < 100 \end{cases}.$$

Figure 6:
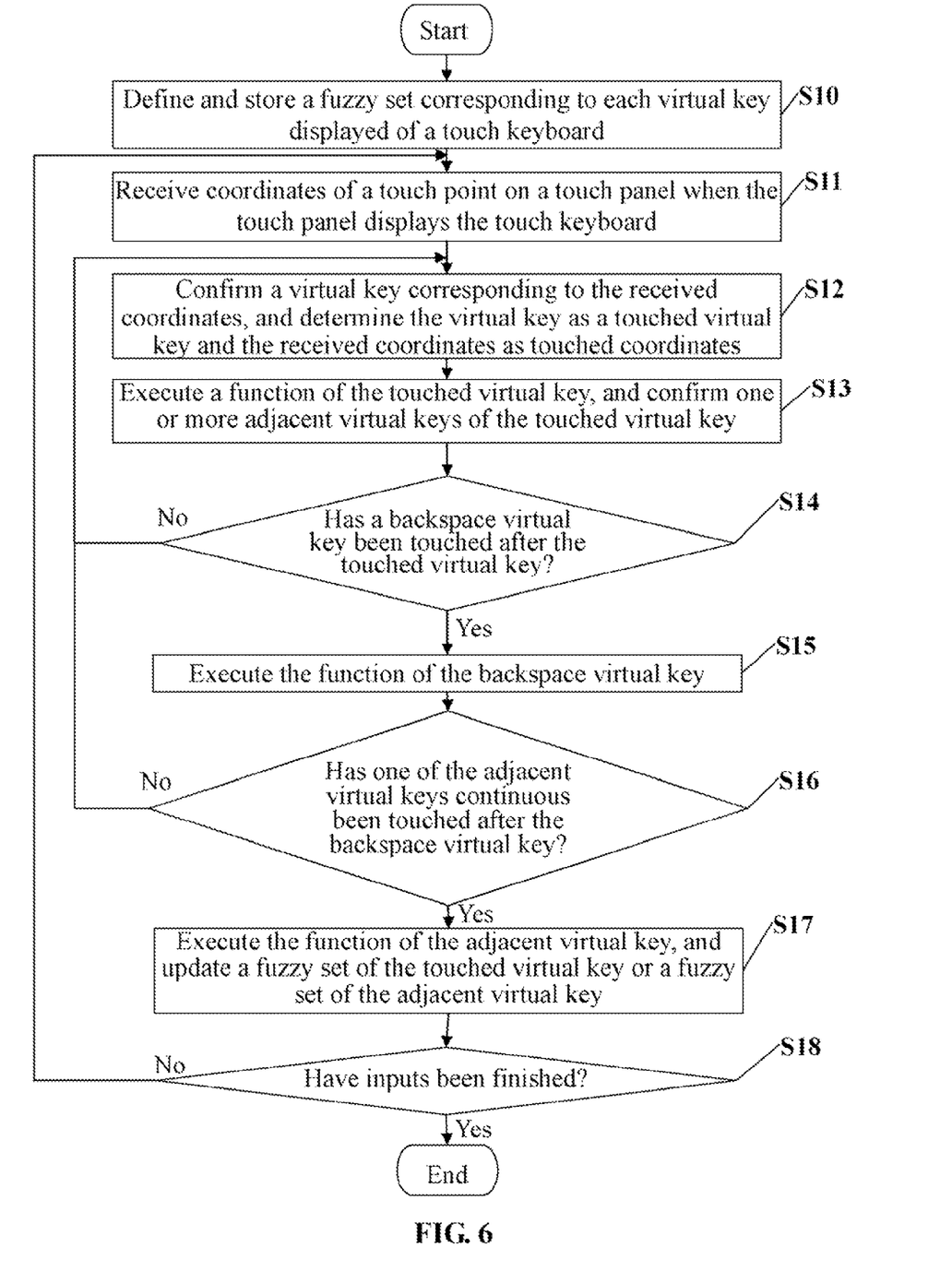
FIG. 6 is a flowchart of one embodiment of a method for improving recognition of a touch keyboard in an electronic device of FIG. 1.

FIG. 6 is a flowchart of one embodiment of a method for improving recognition of a touch keyboard in an electronic device of FIG. 1. Depending on the embodiment, additional blocks may be added, others deleted, and the ordering of the blocks may be changed.

In block S10, the definition module 100 defines a fuzzy set corresponding to each virtual key of the touch keyboard displayed on the touch panel 40, and stores the fuzzy set in the storage system 30. In some embodiments, the fuzzy set corresponding to each virtual key defines a plurality of membership functions of each virtual key, each of the membership functions correspond to an x interval and a y interval of a coordinate system based on the touch panel 40.

In block S11, The receiving module 102 receives coordinates of a touch point on the touch panel 40 according to a user operation on the touch panel 40, upon the condition that the display panel 40 displays the touch keyboard. The coordinates of the touch point includes an x coordinate and a y coordinate based on a coordinate system on the touch panel 40.

In block S12, the confirmation module 104 confirms a virtual key corresponding to the received coordinates according to the fuzzy sets of the virtual keys on the touch keyboard, and determines the virtual key as a touched virtual key and the received coordinates as touched coordinates.

In block S13, the processing module 106 executes a function corresponding to the touched virtual key on the virtual keyboard 20, and the confirmation module 104 confirms one or more adjacent virtual keys of the touched virtual key, after the function of the touched virtual key is executed.

In block S14, the determination 108 determines whether the backspace virtual key on the touch keyboard has been touched after the touched virtual key. If the backspace virtual key on the touch keyboard has been touched, block S15 is implemented. If the backspace virtual key has not been touched, block S12 is repeated.

In block S15, the processing module 106 executes a function of the backspace virtual key, such as deleting a previous input of the virtual key of the touch keyboard 40, for example.

In block S16, the determination module 108 continues to determine whether the virtual key of a continuous received coordinate is one of the adjacent virtual keys of the touched virtual key, after the coordinate value of the backspace virtual key. If the adjacent virtual key is continually touched, a function of the adjacent virtual key is executed, and block S17 is implemented; if the adjacent virtual key is not continually touched, block S12 is repeated.

In block S17, the processing module 106 revises a fuzzy set of the touched virtual key or a fuzzy set of the adjacent virtual keys, and stores the revised fuzzy set into the storage system 30, to replace an original fuzzy set of the touched virtual key or the adjacent virtual keys.

In block S18, the determination module 108 determines whether inputs of the virtual keys have been finished. If the inputs have been finished then the procedure ends. However, if the inputs have not been finished, then block S11 is repeated.

Figure 7:
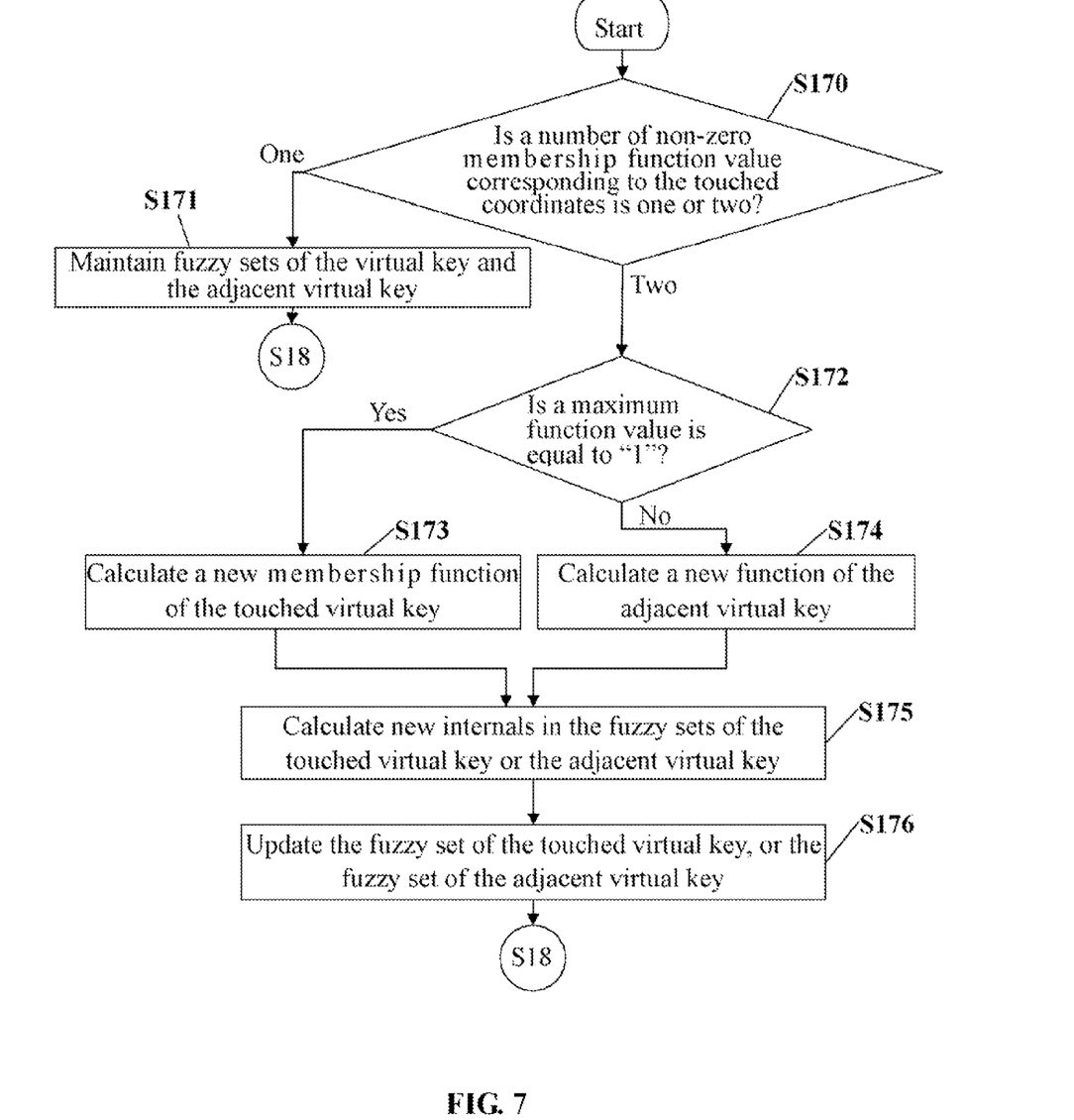
FIG. 7 is the flowchart of one embodiment of a method for revising fuzzy sets of the virtual keys of a touch keyboard of FIG. 2.

FIG. 7 is a flowchart of one embodiment of a method for revising fuzzy sets of the virtual keys of a touch keyboard of FIG. 2. Depending on the embodiment, additional blocks may be added, others deleted, and the ordering of the blocks may be changed.

In block S170, the validation submodule 160 validates the number of the non-zero membership function value corresponding to the touched coordinates. In some embodiments, if the number of the non-zero membership function value is two, then block S172 is implemented; if the number of the non-zero membership function value is one, then block S171 is implemented.

In block S171, the update submodule 162 maintains the fuzzy set of the touched virtual key and the fuzzy set of the adjacent virtual key, block S18 is repeated.

In block S172, the validation submodule 160 confirms whether a maximum membership function value is equal to "1". If the maximum membership function value is equal to "1", then block S173 is implemented. If maximum membership function value is not equal to "1", then block S174 is implemented.

In block S173, the calculation submodule 161 calculates a new membership function of the touched virtual key according to the touched coordinates, block S175 is implemented.

In block S174, the calculation submodule 161 calculates a new membership function of the adjacent virtual key according to the touched coordinates, block S175 is implemented.

In block S175, the calculation submodule 161 calculates new intervals in the fuzzy set of the touched virtual key, or new intervals in the fuzzy set of the adjacent virtual key.

In block S176, the update submodule 162 updates the fuzzy set of the touched virtual key or the fuzzy set of the adjacent virtual key according to the new membership and the new intervals.

It should be emphasized that the described exemplary embodiments are merely possible examples of implementations, and set forth for a clear understanding of the principles of the present disclosure. Many variations and modifications may be made to the-described exemplary embodiments without departing substantially from the spirit and principles of the present disclosure. All such modifications and variations are intended to be comprised herein within the scope of this disclosure and the-described inventive embodiments, and the present disclosure is protected by the following claims.

What is claimed is:

1. An electronic device, comprising:
   a storage system;
   a touch panel;
   at least one processor;
   one or more programs that are stored in the storage system and are executed by the at least one processor, the one or more programs comprising:
   a definition module that defines and stores a fuzzy set corresponding to each virtual key of a touch keyboard displayed on the touch panel, wherein the fuzzy set corresponding to each virtual key defines a plurality of membership functions of each virtual key;

a receiving module that receives coordinates of a touch point on the touch panel;

a confirmation module that confirms at least one membership function in the fuzzy set according to the received coordinates for obtaining at least one non-zero membership value, confirms a virtual key corresponding to the received coordinates according to fuzzy sets of virtual keys of the touch keyboard, and determines the virtual key as a touched virtual key and the received coordinates as touched coordinates, wherein the virtual key is confirmed by the one non-zero membership function value from the plurality of the fuzzy sets according to the received coordinates when a number of the at least one non-zero membership function value is one, and the virtual key is confirmed by the larger non-zero membership function value in the two non-zero membership function values when the number of the at least one non-zero membership function value is two;

a processing module that executes a function corresponding to the touched virtual key on the virtual keyboard;

the confirmation module further confirms one or more adjacent virtual keys of the touched virtual key, after the function of the touched virtual key is executed;

the processing module further revises a fuzzy set of the touched virtual key or a fuzzy set of one of the adjacent virtual keys, upon the condition that a backspace virtual key of the touch keyboard and the adjacent virtual key have been touched in turn after the touched virtual key.

2. The electronic device as claimed in claim 1, wherein the one or more programs further comprises a determination module that determines whether inputs of the virtual keys have been finished.

3. The electronic device as claimed in claim 1, wherein each of the membership functions corresponds to an x interval and a y interval of a coordinate system based on the touch panel.

4. The electronic device as claimed in claim 1, wherein the one or more adjacent virtual keys of the touched virtual key have an intersection on x intervals with the touched virtual key.

5. The electronic device as claimed in claim 4, wherein the processing module revises the fuzzy sets by:

validating the number of the non-zero membership function value corresponding to the touched coordinates;

maintaining the fuzzy set of the touched virtual key and the fuzzy set of the adjacent virtual key, upon the condition that the number of the non-zero membership function value corresponding to touched coordinates is one; or confirming whether the maximum membership function value is equal to "1", upon the condition that the number of the non-zero membership function value corresponding to touched coordinates is two;

calculating a new membership function of the touched virtual key according to the touched coordinates, in response to that the maximum membership function value is equal to "1"; or calculating a new membership function of the adjacent virtual key according to the touched coordinates, in response to that the maximum membership function value is not equal to "1"; and calculating new intervals in the fuzzy set of the touched virtual key, or new intervals in the fuzzy set of the adjacent virtual key;

updating the fuzzy set of the touched virtual key or the fuzzy set of the adjacent virtual key according to the new membership and the new intervals.

6. A method for improving recognition of a touch keyboard in an electronic device, the electronic device comprising a storage system, a touch panel and at least one processor, the method comprising:

defining and storing a fuzzy set corresponding to each virtual key of a touch keyboard displayed on the touch panel, wherein the fuzzy set corresponding to each virtual key defines a plurality of membership functions of each virtual key;

receiving coordinates of a touch point on the touch panel;

confirming at least one membership function in the fuzzy set according to the received coordinates for obtaining at least one non-zero membership value, and confirming a virtual key corresponding to the received coordinates according to fuzzy sets of virtual keys of the touch keyboard, determining the virtual key as a touched virtual key and the received coordinates as touched coordinates, wherein the virtual key is confirmed by the one non-zero membership function value from the plurality of the fuzzy sets according to the received coordinates when a number of the at least one non-zero membership function value is one, and the virtual key is confirmed by the larger non-zero membership function value in the two non-zero membership function values when the number of the at least one non-zero membership function value is two;

executing a function corresponding to the touched virtual key on the virtual keyboard;

confirming one or more adjacent virtual keys of the touched virtual key, after the function of the touched virtual key is executed;

revising a fuzzy set of the touched virtual key or a fuzzy set of one of the adjacent virtual keys, upon the condition that a backspace virtual key and the adjacent virtual key have been touched in turn after the touched virtual key.

7. The method as claimed in claim 6, further comprising:
determining whether inputs of the virtual keys have been finished.

8. The method as claimed in claim 6, wherein each of the membership functions corresponds to an x interval and a y interval of a coordinate system based on the touch panel.

9. The method as claimed in claim 6, wherein the one or more adjacent virtual keys of the touched virtual key have an intersection on x intervals with the touched virtual key.

10. The method as claimed in claim 9, wherein the fuzzy sets are revises by:

validating the number of the non-zero membership function value corresponding to the touched coordinates;

maintaining the fuzzy set of the touched virtual key and the fuzzy set of the adjacent virtual key, upon the condition that the number of the non-zero membership function value corresponding to touched coordinates is one; or confirming whether the maximum membership function value is equal to "1", upon the condition that the number of the non-zero membership function value corresponding to touched coordinates is two;

calculating a new membership function of the touched virtual key according to the touched coordinates, in response to that the maximum membership function value is equal to "1"; or calculating a new membership function of the adjacent virtual key according to the touched coordinates, in response to that the maximum membership function value is not equal to "1"; and calculating new intervals in the fuzzy set of the touched virtual key, or new intervals in the fuzzy set of the adjacent virtual key;

updating the fuzzy set of the touched virtual key or the fuzzy set of the adjacent virtual key according to the new membership and the new intervals.

11. A non-transitory computer readable storage medium storing a set of instructions, the set of instructions capable of executed by a processor to perform a method for improving recognition of a touch keyboard in an electronic device, the method comprising:

defining and storing a fuzzy set corresponding to each virtual key of the touch keyboard displayed on a touch panel of the electronic device, wherein the fuzzy set corresponding to each virtual key defines a plurality of membership functions of each virtual key;

receiving coordinates of a touch point on the touch panel;

confirming at least one membership function in the fuzzy set according to the received coordinates for obtaining at least one non-zero membership value, and confirming a virtual key corresponding to the received coordinates according to fuzzy sets of virtual keys of the touch keyboard, determining the virtual key as a touched virtual key and the received coordinates as touched coordinates, wherein the virtual key is confirmed by the one non-zero membership function value from the plurality of the fuzzy sets according to the received coordinates when a number of the at least one non-zero membership function value is one, and the virtual key is confirmed by the larger non-zero membership function value in the two non-zero membership function values when the number of the at least one non-zero membership function value is two;

executing a function corresponding to the touched virtual key on the virtual keyboard;

confirming one or more adjacent virtual keys of the touched virtual key, after the function of the touched virtual key is executed;

revising a fuzzy set of the touched virtual key or a fuzzy set of one of the adjacent virtual keys, upon the condition that a backspace virtual key and the adjacent virtual key have been touched in turn after the touched virtual key.

12. The storage medium as claimed in claim 11, further comprising:
determining whether inputs of the virtual keys have been finished.

13. The storage medium as claimed in claim 11, wherein each of the membership functions corresponds to an x interval and a y interval of a coordinate system based on the touch panel.

14. The storage medium as claimed in claim 11, wherein the one or more adjacent virtual keys of the touched virtual key have an intersection on x intervals with the touched virtual key.

15. The storage medium as claimed in claim 14, wherein the fuzzy sets are revises by:

validating the number of the non-zero membership function value corresponding to the touched coordinates;

maintaining the fuzzy set of the touched virtual key and the fuzzy set of the adjacent virtual key, upon the condition that the number of the non-zero membership function value corresponding to touched coordinates is one; or confirming whether the maximum membership value is equal to "1", upon the condition that the number of the non-zero membership function value corresponding to touched coordinates is two;

calculating a new membership function of the touched virtual key according to the touched coordinates, in response to that the maximum membership function value is equal to "1"; or calculating a new membership function of the adjacent virtual key according to the touched coordinates, in response to that the maximum membership function value is not equal to "1"; and calculating new intervals in the fuzzy set of the touched virtual key, or new intervals in the fuzzy set of the adjacent virtual key;

updating the fuzzy set of the touched virtual key or the fuzzy set of the adjacent virtual key according to the new membership and the new intervals.

* * * * *